(12) United States Patent
Park (10) Patent No.: US 9,182,537 B2
(45) Date of Patent: Nov. 10, 2015

(54) BACKLIGHT UNIT AND LIQUID CRYSTAL DISPLAY DEVICE COMPRISING THE SAME

(71) Applicant: LG Display Co., Ltd., Seoul (KR)

(72) Inventor: Sang-Hyun Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 13/862,183

(22) Filed: Apr. 12, 2013

(65) Prior Publication Data

US 2014/0168573 A1  Jun. 19, 2014

(30) Foreign Application Priority Data

Dec. 18, 2012 (KR) .................. 10-2012-0148899

(51) Int. Cl.
*G02F 1/1335* (2006.01)
*F21V 8/00* (2006.01)
*G02F 1/1333* (2006.01)

(52) U.S. Cl.
CPC .............. *G02B 6/0091* (2013.01); *G02B 6/009* (2013.01); *G02B 6/0088* (2013.01); *G02F 1/133615* (2013.01); *G02F 2001/133322* (2013.01)

(58) Field of Classification Search
CPC .............. G02F 1/133615; G02F 2001/133322; G02B 6/0091; G02B 6/009; G02B 6/0086; G02B 6/0088
USPC .................... 349/58, 65, 149; 362/97.1–97.3, 362/632–634
See application file for complete search history.

(56) References Cited

U.S. PATENT DOCUMENTS

| | | | |
|---|---|---|---|
| 2001/0002145 A1* | 5/2001 | Lee et al. | 349/58 |
| 2002/0044250 A1* | 4/2002 | Yoo et al. | 349/149 |
| 2008/0252808 A1* | 10/2008 | Chang | 349/58 |
| 2008/0291356 A1* | 11/2008 | Kim | 349/58 |
| 2009/0262277 A1* | 10/2009 | Kim | 349/58 |
| 2012/0120326 A1* | 5/2012 | Takata | 348/790 |
| 2012/0300154 A1* | 11/2012 | Tanaka | 349/58 |
| 2013/0058125 A1* | 3/2013 | Chen | 362/602 |

FOREIGN PATENT DOCUMENTS

CN  101109870 A  1/2008

OTHER PUBLICATIONS

Office Action for Chinese Patent Application No. CN 201310165861.0, Aug. 25, 2015, 20 Pages.

* cited by examiner

*Primary Examiner* — Michael Caley
(74) *Attorney, Agent, or Firm* — Fenwick & West LLP (57) ABSTRACT

Disclosed are a backlight unit and a liquid crystal display device including the same with a light guide plate of a reduced size to enable driving at a low power and manufacture at a low cost despite using fewer light sources, and realizing high-brightness and high quality-driving. The backlight unit includes a lower case having a bottom surface and side walls extending upward extended from edges of the bottom surface. A supporter on the bottom surface is placed along a side surface of the side wall which forms an accommodation area in conjunction with the supporter. A light guide plate is disposed in the accommodation area.

18 Claims, 6 Drawing Sheets

BACKLIGHT UNIT AND LIQUID CRYSTAL DISPLAY DEVICE COMPRISING THE SAME

CROSS-REFERENCE TO RELATED APPLICATION

This application claims the benefit of Korean Patent Application No. 10-2012-0148899, filed on Dec. 18, 2012, which is hereby incorporated by reference as if fully set forth herein.

BACKGROUND

1. Field of the Invention

The disclosure relates to a backlight unit and a liquid crystal display device comprising the same. More specifically, the disclosure relates to a backlight unit and a liquid crystal display device with a light guide plate of a reduced size.

2. Discussion of the Related Art

A liquid crystal display (LCD) device is a flat panel display device which is capable of displaying images of high quality and consuming low power compared to other types of display devices. Moreover, LCD devices can have a small size compared to other types of flat panel display devices, and thus, can be used in a variety of fields. Such LCD device includes two substrates facing each other and a liquid crystal panel containing liquid crystals disposed therebetween. The LCD device displays images by changing orientation of liquid crystals through an electric field applied to the liquid crystals.

A liquid crystal panel in the LCD device is a display panel that is incapable of emitting light by itself, and hence, a light source such as backlight unit (BLU) is needed to display an image. The BLU is generally coupled to a liquid crystal panel.

In recent years, the LCD devices including the liquid crystal panel and the BLU achieve high brightness and high quality using low-power high-output light sources such as light emitting diode (LED) as the light source of the BLU. Images of higher brightness and higher image quality in the liquid crystal display device by improving transmittance of light, reducing the thickness of optical elements, and increasing the number of light source elements in a light source. However, such measures may entail increase in power consumption and manufacturing cost.

SUMMARY

Embodiments relate to a backlight unit in a display device that includes a rectangular lower case, a supporter and a light guide plate. The rectangular lower case has a bottom surface and four side walls each extending upward from each of the four edges of the surface. The supporter is placed on the bottom surface configured for placement along at least one of the four side walls of the rectangular lower case below a pad portion of a liquid crystal panel to form an accommodation area in conjunction with others of the four walls of the rectangular lower case. The light guide plate is disposed in the accommodation area, the light guide plate configured to transmit light received at a side surface to a top surface.

In one embodiment, the surface of the supporter facing a side surface of the light guide plate is formed with a pattern to reduce non-uniform illumination at the top surface of the light guide plate.

In one embodiment, the backlight unit further includes a reflection sheet between the light guide plate and the bottom surface of the rectangular lower case to reflect light emitted from a bottom surface of the light guide plate.

In one embodiment, the backlight unit includes a reflection member between one or more side surfaces of the light guide plate and corresponding one or more side walls of the rectangular lower case. The reflection sheet comprises a bent portion covering the side surface and a part of a top surface of the light guide plate.

In one embodiment, the backlight unit includes a light source including at least one light source element at the bent portion to provide the light to the light guide plate.

In one embodiment, the bent portion is formed with at least one hole, and the at least one light source element is disposed to correspond to the at least one hole.

In one embodiment, the backlight unit includes an adhesion member to bond the reflection member to the one or more side walls.

In one embodiment, the backlight unit includes an optical sheet on the light guide plate, the optical sheet having a leg portion extending from an edge of the optical sheet facing the supporter.

In one embodiment, the supporter has a stepped edge for mounting the leg portion of the optical sheet, and a height of a top surface of the supporter is greater than a sum of a thickness of the light guide plate and a thickness of the optical sheet.

In one embodiment, the supporter is a reflector.

In one embodiment, the supporter is spaced away from the light guide plate.

In one embodiment, the width of the light guide plate is less than 110% of a width of an active area of the liquid crystal panel, and a length of the light guide plate is less than 110% of the length of the active area of the liquid crystal panel.

BRIEF DESCRIPTION OF THE DRAWINGS

The accompanying drawings included to provide a further understanding of the disclosure illustrate embodiments. In the drawings.

DETAILED DESCRIPTION OF EMBODIMENTS

Reference will now be made in detail to the preferred embodiments, examples of which are illustrated in the accompanying drawings. Wherever possible, the same reference numbers will be used throughout the drawings to refer to the same or like parts.

It should be noted that identical elements are designated by the same reference numerals although they are shown in other drawings. A detailed description of well-known functions or configurations may be omitted when it is considered to obscure the subject matter. Some features illustrated in the drawings are enlarged, reduced or simplified for better understanding and the drawings and components thereof are not necessarily illustrated at a proper ratio (magnification).

Figure 1:
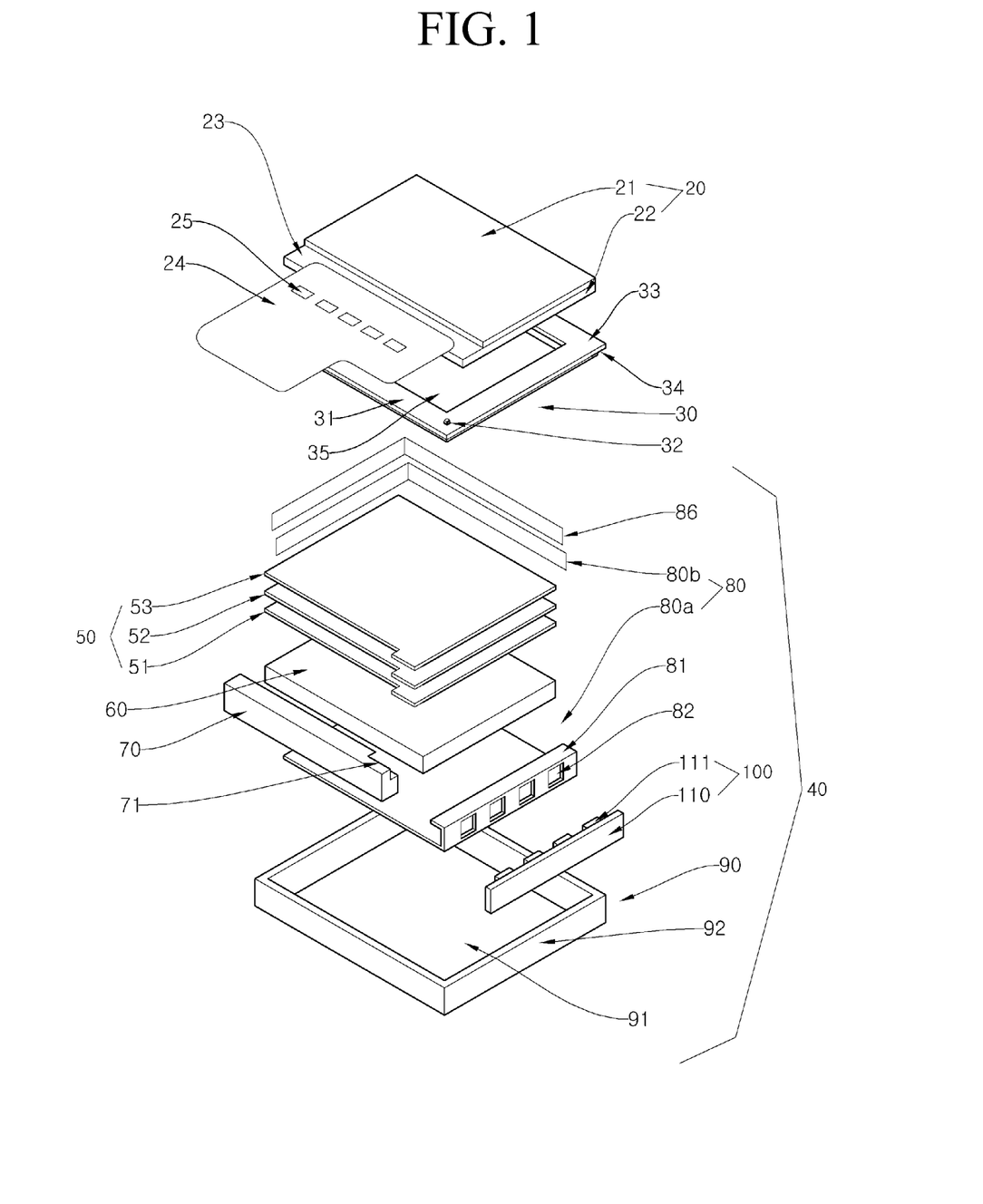
FIG. 1 is a perspective view illustrating a liquid crystal display (LCD) device according to one embodiment.
Figure 4:
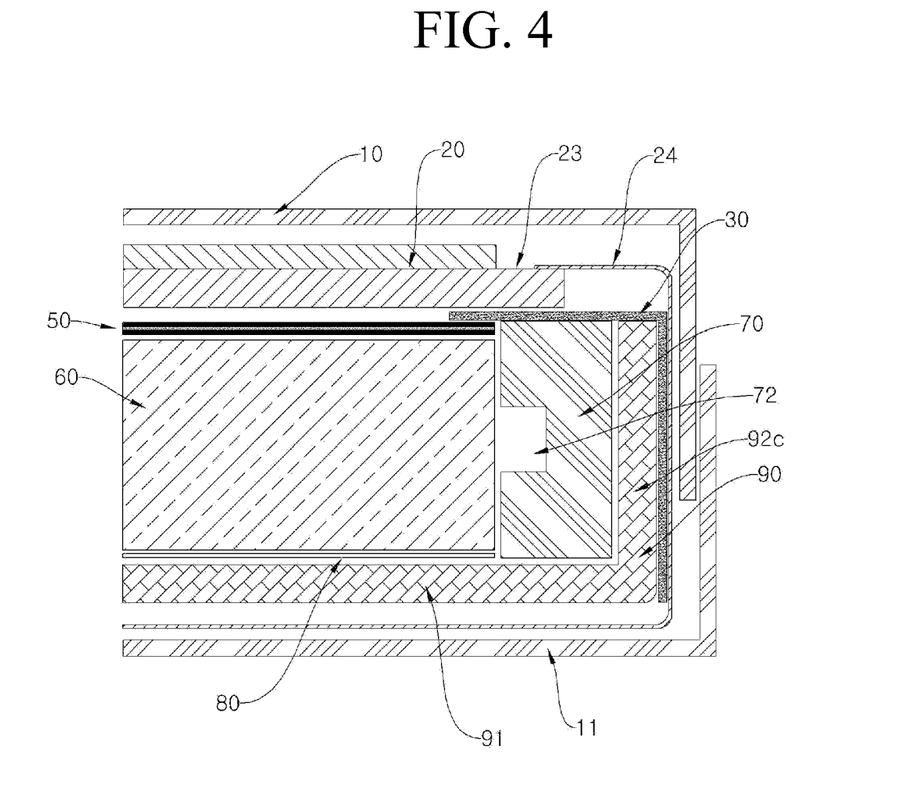
FIG. 4 is a partial cross-sectional view of the LCD device of FIG. 2, according to one embodiment.

FIG. 1 is a perspective view illustrating a liquid crystal display (LCD) device according to one embodiment. The LCD of FIG. 1 includes a liquid crystal panel 20, a guide panel 30 and a backlight unit 40 and may further include a top case 10 (as illustrated in FIG. 4).

The liquid crystal panel 20 is mounted on one surface of the guide panel 30 such that the liquid crystal panel 20 is disposed in an upper part of the backlight unit 40. The liquid crystal panel 20 displays an image by controlling transmittance of light emitted from the backlight unit 40. For this purpose, the liquid crystal panel 20 includes an upper substrate 21, a lower substrate 22 and liquid crystal (not shown) disposed between the upper substrate 21 and the lower substrate 22.

The upper substrate 21 is provided with blue, green red color filters, a black matrix (BM) and a common electrode. The lower substrate 22 is provided with a thin film transistor formed in each of cell regions defined by data lines and gate lines and a pixel electrode connected to the thin film transistor. The thin film transistor supplies a data signal supplied from the date line to the pixel electrode in response to a gate signal supplied from the gate line. The common electrode may be formed on the lower substrate 22 or on other components. A pad portion 23 herein refers to a portion of the lower substrate 22 providing connection between an external driving circuit and data lines and/or gate lines. The pad portion 23 does not display image and is part of a non-display region of the lower substrate 22.

A circuit film 24 is connected to the pad portion 23. An integrated circuit 25 including a data integrated circuit (IC) and a gate IC mounted on the circuit film 24. The data IC supplies an image signal to the data lines. The gate IC supplies a gate scan signal to the gate lines. The circuit film 24 may be a tape carrier package or a chip on film. The integrated circuit 25 may be mounted on the pad portion 23 by a chip on glass method. In this case, the integrated circuit 25 mounted on the pad portion 23 receives the gate signal and the image signal through the circuit film 24 from the circuit substrate. Further, the pad portion 23 is a side of the lower substrate 22 (of the liquid crystal panel 20) that extends beyond the upper substrate 21. The pad portion 23 may be formed on at both sides of the liquid crystal panel 20 or be formed at one side (as illustrated in FIG. 1).

In particular, the pad portion 23 is disposed above a supporter 70 of the backlight unit 40, as described below in detail. As a result, interior space of the liquid crystal display device can be utilized by forming the circuit film 24 in a region in which an image is not displayed.

Further, the liquid crystal panel 20 is mounted on a mounting portion 31 of the guide panel 30 such that it is biased to one edge of the guide panel 30.

The guide panel 30 couples the liquid crystal panel 20 to the backlight unit 40, separates the liquid crystal panel 20 from the backlight unit 40 by a predetermined distance and secures these components. The guide panel 30 is formed of a frame with a light transmission window 35 to transfer light supplied from the backlight unit 40 to the liquid crystal panel 20.

The mounting portion 31 is formed on the front surface 33 and the rear surface 34 of the guide panel 30, the liquid crystal panel 20 is mounted on the front mounting portion 31, and the backlight unit 40 is mounted on the rear mounting portion 31. Further, a stopper 32 may be formed on the guide panel 30 extending from the mounting portion 31. The stopper 32 functions to fix the liquid crystal panel 20 at an intended position on the mounting portion 31. In particular, the stopper 32 of the guide panel 30 of the present invention is mounted on the mounting portion 31 such that it is biased and fixed on a side edge of the liquid crystal panel 20. Fixing of the liquid crystal panel 20 and formation of the stopper 32 will be described below in more detail with reference to the backlight unit 40.

The backlight unit 40 is disposed in a lower part of the liquid crystal panel 20 such that the guide panel 30 is interposed between the backlight unit 40 and the liquid crystal panel 20, and generates light and supplies the same to the liquid crystal panel 20. For this purpose, the backlight unit 40 includes an optical sheet 50, a light guide plate 60, a supporter 70, a reflection part 80, a lower case 90 and a light source 100.

The lower case 90 includes a bottom surface 91 and a wall body 92 extending upward from the edges of the bottom surface 91. The lower case 90 accommodates and protects the light source 100, the light guide plate 60, the supporter 70, the reflection part 80 and the optical sheet 50 in interior space between the wall body 92 and the bottom surface 91, and fixes the accommodated components on the lower surface of the liquid crystal panel 20 through the guide panel 30. In addition, the supporter 70 is disposed in a part of the interior space on the bottom surface 91 along one of four sides of wall bodies 92. The lower case 90 forms an accommodation area in conjunction with the supporter 70, and the light guide plate 60, the reflection part 80 and the optical sheet 50 are disposed in the accommodation area.

The light source 100 has a light source circuit substrate 110 and a light source element 111 being mounted on the light source circuit substrate 110. The light source 100 generates light. The light source element 111 may be a light emitting diode (LED), a cold cathode fluorescent lamp (CCFL), or an external electrode fluorescent lamp (EEFL).

Light emitted from the light source 100 is incident upon the light guide plate 60 and is supplied to the liquid crystal panel 20 through the light guide plate 60, the optical sheet 50 and the reflection sheet 91. The light source 100 is disposed between the light guide plate 60 and the wall body 92 of the lower case 90 including side walls such that the wall body 92 faces at least one side of the light guide plate 60. In particular, the light source element 111 mounted on the light source circuit substrate 110 is disposed at a position corresponding to a hole 82 formed in a bent portion 81 of the reflection part 80.

The optical sheet 50 focuses or diffuses light emitted through the light guide plate 60 to transfer the same to the liquid crystal panel 20. For this purpose, the optical sheet 50 may include at least one of a diffusion sheet 52 and a light collection sheet 53. In addition, if desired, as shown in FIG. 1, the optical sheet 50 may include a multi-layer optical film 53.

The diffusion sheet 52 functions to prevent concentration of light emitted through the light guide plate 60 in a predetermined part and to uniformly distribute the light in the liquid crystal panel 20. The diffusion sheet 52 may be disposed in regions requiring light distribution, such as regions between the light collection sheet 51 and the liquid crystal panel 20, and regions between the light collection sheet 51 and the light guide plate 60. The diffusion sheet 52 diffuses light collected by the light collection sheet 51 or the light guide plate 60 to increase or retain a wide viewing angle of the liquid crystal panel 20 and uniformly transfer the light to the liquid crystal panel 20. In addition, if desired, the diffusion sheet 52 may be omitted. The embodiment of FIG. 1 illustrates the diffusion sheet 52 disposed between the liquid crystal panel 20 and the light collection sheet 51 but the diffusion sheet 52 may be omitted in other embodiments.

The light collection sheet 51 collects light from the light guide plate 60 and enables the light to be vertically transferred to the liquid crystal panel 20. For this purpose, the light collection sheet 51 has a pattern enabling collection of light in at least one of a top surface of the light collection sheet 51 facing the liquid crystal panel 20 and a bottom surface of the light collection sheet 51 facing the light guide plate 60. In particular, the light collection sheet 51 of the present invention may be a reverse prism sheet, a sheet pattern of which is formed on the surface of the light collection sheet 51 facing the light guide plate 60. In addition, the diffusion sheet 52 may be interposed between the light collection sheet 51 and the liquid crystal panel 20, or the light collection sheet 51 may include two or more sheets.

The reflection part 80 is disposed in the lower part and the side surface of the light guide plate 60 to reflect light emitted to surfaces of the light guide plate 60 excluding a top surface of the light guide plate 60 into the light guide plate 60. For this purpose, the reflection part 80 includes a reflection sheet 80a between the light guide plate 60 and the bottom surface 91 of the lower case 90, and a reflection member 80b between the side surface of the light guide plate 60 and the wall body 92 of the lower case 90.

In particular, the reflection part 80 has a bent portion 81 which extends upwards and then inwards at one end of the reflection sheet 80a. The bent portion 81 covers the side surface and the upper surface part of the light guide plate 60. In particular, the light source 100 is disposed between the bent portion 81 and the wall body 92 of the lower case 90. The bent portion 81 includes at least one hole 82 corresponding to the position of the light source element 111 on the light source substrate 110 of the light source 100. As a result, light emitted from the light source element 111 is transferred through the hole 82 to the side surface of the light guide plate 60. The bent portion 81 prevents blurring from occurring when light emitted from the light source element 111 is incident upon the light guide plate 60. The bent portion 81 also prevents white spots from occurring due to partial concentration of light on the liquid crystal display device by reflecting light emitted from near the light source element 111 to the light guide plate 60.

The reflection member 80b is disposed between the side surface of the light guide plate 60 and the wall body 92 and returns light emitted through the side surface of the light guide plate 60 to the light guide plate 60. For this purpose, the reflection member 80b is formed on the surface on which the bent portion 81 and the supporter 70 are not disposed.

An adhesive member 86 for bonding and fixing the reflection member 80b and the wall body 92 may be provided between the reflection member 80b and the wall body 92. Further, the reflection member 80b may be integrated with the reflection sheet 80a.

The light guide plate 60 is disposed on the bottom surface 91 of the lower case 90 in parallel with the supporter 70. The light guide plate 60 guides light emitted from the light source 100, collects or diffuses the light and emits the same to the liquid crystal panel 20. The light guide plate 60 is present in the accommodation area formed by the supporter 70 and the wall body 92 of the lower case 90. As a result, the light guide plate 60 is disposed at one side of the lower case 90 where the light source 100 and the supporter 70 are not disposed. In particular, the light guide plate 60 of the present invention has a size corresponding to an active area of the liquid crystal panel 20. The active area herein refers to a substantial display region in which an image is displayed by the liquid crystal. The active area excludes edges of the liquid crystal panel 20 and the pad portion 23 provided as spare areas for manufacture of the liquid crystal panel 20. The active area will be described with reference to the annexed drawing in more detail.

The supporter 70 is disposed on the bottom surface 91 of the lower case 90 such that it contacts one of the side walls of the lower case 90. The supporter 70 fixes the light guide plate 60 in the accommodation area. For this purpose, the supporter 70 prevents the light guide plate 60 having a smaller area than that of the lower case 90 from being moved in the lower case 90 and enables the light guide plate 60 to be biased to a side edge 94 of the lower case 90. Further, the supporter 70 may be made of a synthetic resin or a metal such as aluminum or an alloy. In addition, the supporter 70 is surface-coated with a white paint to reflect light, is made of a white material, or is plated with a highly reflective metal or is made of the metal.

Figure 2:
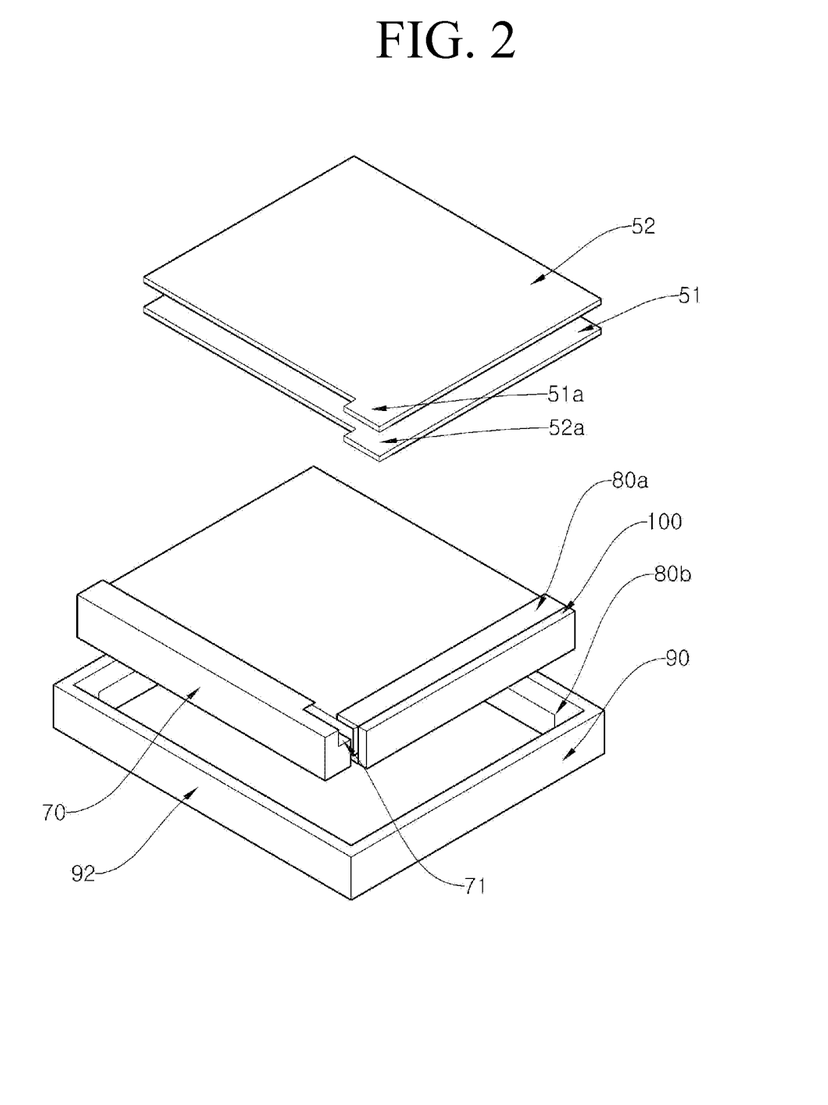
FIG. 2 is a perspective view illustrating a backlight unit of the LCD device of FIG. 1, according to one embodiment.
Figure 3:
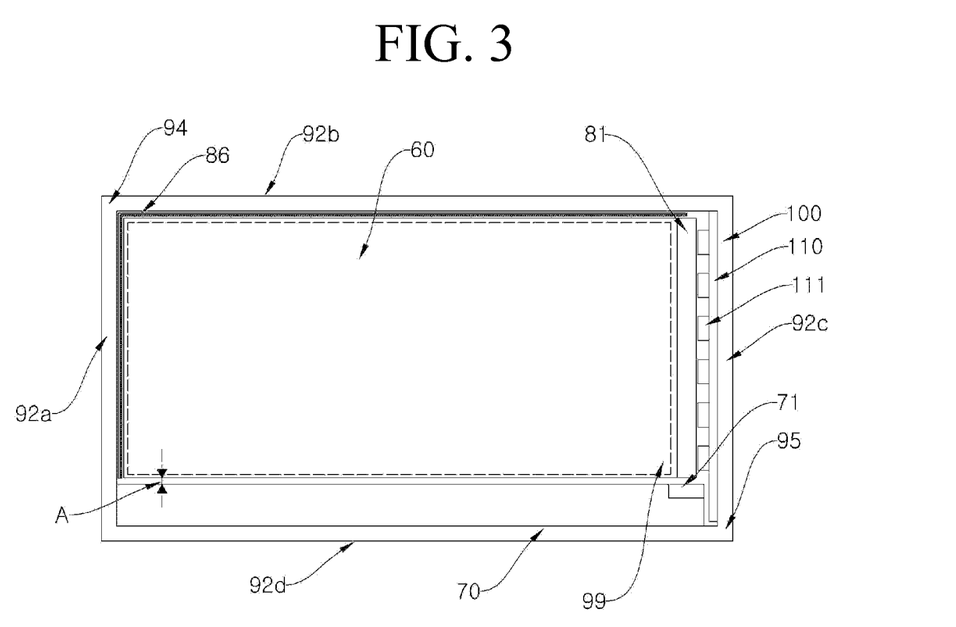
FIG. 3 is a plan view illustrating a partial configuration of FIG. 2, according to one embodiment.

FIG. 2 is a perspective view illustrating the backlight unit of FIG. 1, according to one embodiment. FIG. 3 is a plan view illustrating the backlight unit of FIG. 1, according to one embodiment. The backlight unit 90 has a configuration in which the light guide plate 60 is biased to the side edge 94. The light source 100 and the supporter 70 are disposed on two side walls 92 contacting the other side edge 95. In the backlight unit 90 of the present invention, the light guide plate 60 has a size corresponding to the active area (corresponding to active area 163 of FIG. 5B) of the liquid crystal panel 20. That is, the light guide plate 60 has an area slightly larger than the active area. The area of the light guide plate 60 is determined by experimentation, rather than arithmetical calculation, and has a level that improves brightness and enables prevention of light leakage on the edge of the light guide plate 60, when a reduced size of the light guide plate 60 corresponds to the area of the active area. Specifically, a width and a length of the light guide plate 60 may be 110% or less of those of the active area.

Embodiments make the size of the light guide plate 60 as small as possible, thus preventing light waste due to the light guide plate 60 and improving brightness. In particular, since the light guide plate 60 has an area slightly larger than the active area of the liquid crystal panel 20, the position of the active area (corresponding to active area 163 of FIG. 5B) and the position of the light guide plate 60 should be aligned accurately. For this reason, when the liquid crystal panel 20 is mounted on the guide panel 30, the active area is biased to the side edge and the light guide plate 60 is also disposed in the position corresponding thereto.

For this purpose, the light guide plate 60 is disposed in the lower case 90 such that side surfaces of the light guide plate 60 face adjacent two side walls 92a and 92b and the light source 100 and the supporter 70 are disposed on the remaining two side walls 92c and 92d. In order words, the supporter 70 is disposed in parallel with one side wall 92d in the lower case 90 and comes in contact with the side wall 92d. The light guide plate 60 is disposed in an accommodation area 99 provided in the other side wall 92b in parallel with the one side wall 92d. The light source 100 is disposed on the remaining side wall 92c not contacting the light guide plate, among the side walls 92a and 92c adjacent to the one side wall 92d.

In the embodiments of FIGS. 1 through 3, the supporter 70 is disposed to contact the relatively long side wall 92d and the light source 100 is disposed on the relatively short side wall 92c. However, the positions of the supporter 70 and the light source 100 may be switched.

The reflection member 80b may be disposed between the light guide plate 60 and the bottom surface 91 of the lower case 90 as well as between the side surface of the light guide plate 60 and the side wall 92a or 92b of the lower case 90. In addition, to fix the reflection member 80b, an adhesive member 86 may be provided between the reflection member 80b and the side wall 92a or 92b. Alternatively, the reflection member 80b may be provided between the supporter 60 and the light guide plate 60 or be omitted when the supporter 70 is provided as a reflector.

Meanwhile, as described above, the supporter 70 may be provided with a stepped edge 71. As shown in FIGS. 1 through 3, a stepped edge 71 is formed on one side end of the supporter 70, but the formation position and shape thereof may be changed. A leg portion 51a or 52a of the optical sheet 50 is mounted on the stepped edge 71 and function to fix the optical sheet 50 on the light guide plate 60. For this purpose, the leg portion 51a or 52a in which the surface of the optical sheet 50 extends is formed on the edge adjacent to the supporter 70 among edges of the optical sheet 50, in particular, at the position corresponding to the stepped edge 71.

In addition, the supporter 70 and the light guide plate 60 may be separated from each other by a predetermined distance A that is sufficiently short so as not to cause light leakage. The distance A is provided to accommodate increase in volume of the light guide plate 60 due to increase in temperature. The distance A may be determined based on the thermal expansion coefficient of a material forming the light guide plate 60.

FIG. 4 is a partial cross-sectional view of the LCD device of FIG. 2, according to one embodiment. The supporter 70 is disposed along the side wall 92c of the lower case 90 and the light guide plate 60 is accommodated in the lower case 90 while being adjacent to the supporter 70. As a result, as shown in FIG. 4, the light guide plate 60 can be reduced in a size that is slightly larger than the size of the active area (corresponding to active area 163 of FIG. 5B) of the liquid crystal panel 20.

Meanwhile, although the light guide plate 60 is reduced to a size slightly larger than the active area, the presence of a non-display region, the pad portion 23 in the liquid crystal panel 20 limits reduction of a size of the lower case 90 or a total size of the liquid crystal display device.

Accordingly, a reduced region of the light guide plate 60 is filled with the supporter 70 that is fixed on the side of the light guide plate 60 to prevent light leakage caused by movement of the light guide plate 60 in a remaining space of the lower case 90 and to maintain the position of the light guide plate 60 despite a complicated shape of the guide panel 30 or the lower case 90.

In addition, as shown in FIG. 4, the pad portion 23 is disposed in an upper part of the supporter 70, thus enabling utilization of the remaining space. That is, the pad portion 23 which is non-display space overlaps the supporter 70 which does not emit light, thus reducing the waste of space. In addition, the circuit film 24 is bent so as to surround the side wall 92c on which the supporter 70 is disposed, and is connected to a driving unit disposed on the rear of the lower case 90, thus providing a space for circuit connection.

The top surface of the light guide plate 60 may be illuminated in a non-uniform manner due to reflection of light at the side of the supporter 70 facing the light guide plate 60. Hence, in order to prevent such non-uniform illumination at the top surface of the light guide plate 60, a pattern 72 is formed on the surface of the supporter 70 facing the light guide plate 60. The pattern 72 prevents white spots formed by light emitted from the side of the light guide plate 60 and light reflected by the supporter 70 are concentrated between the light guide plate 60 and the supporter 70. The pattern 72 may be formed lengthwise on the surface of the supporter 70 facing the side surface of the light guide plate 60 in parallel to the side wall 92c, but may be various shapes of patterns such as prism structure or lenticular lens structure.

Further, as shown in FIG. 4, an upper cover 10 and a lower cover 11 constitute the liquid crystal display device. The upper cover 10 and the lower cover 11 function to accommodate and protect the liquid crystal display device and accommodate the remaining components, while exposing the active area of the liquid crystal panel 20.

Figure 5A:
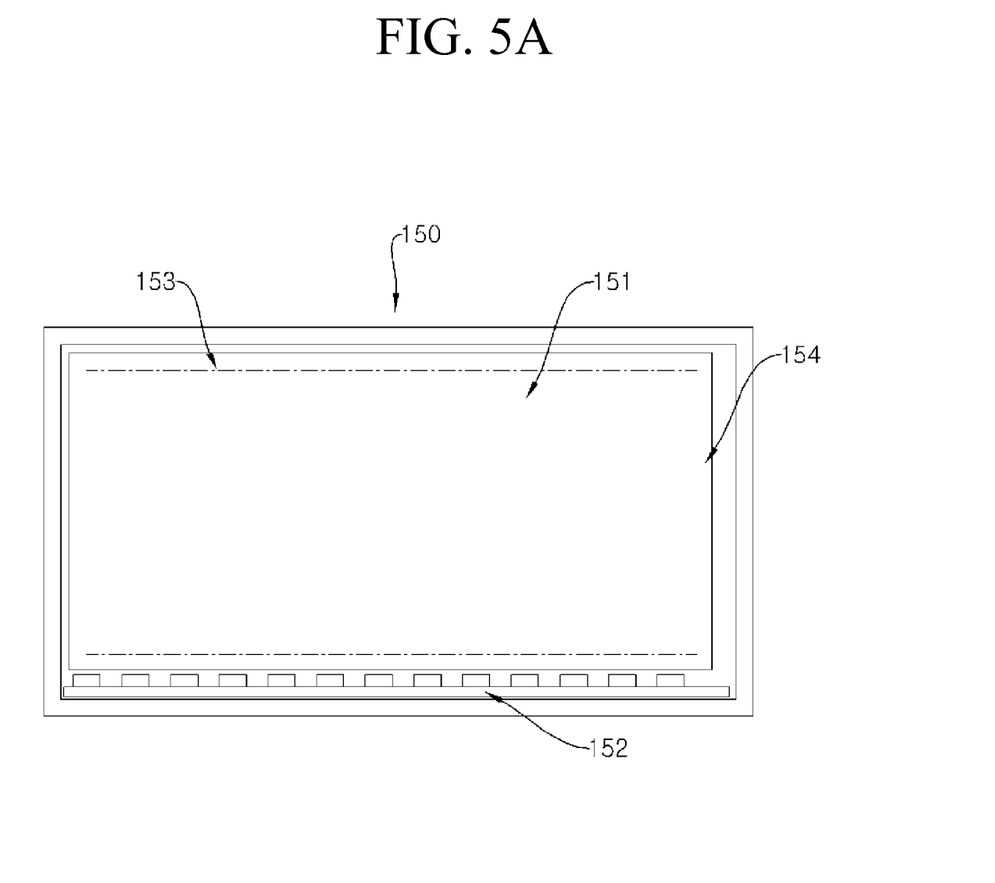
FIG. 5A is a plan view of a backlight unit of a conventional LCD and an active area of a conventional LCD.
Figure 5B:
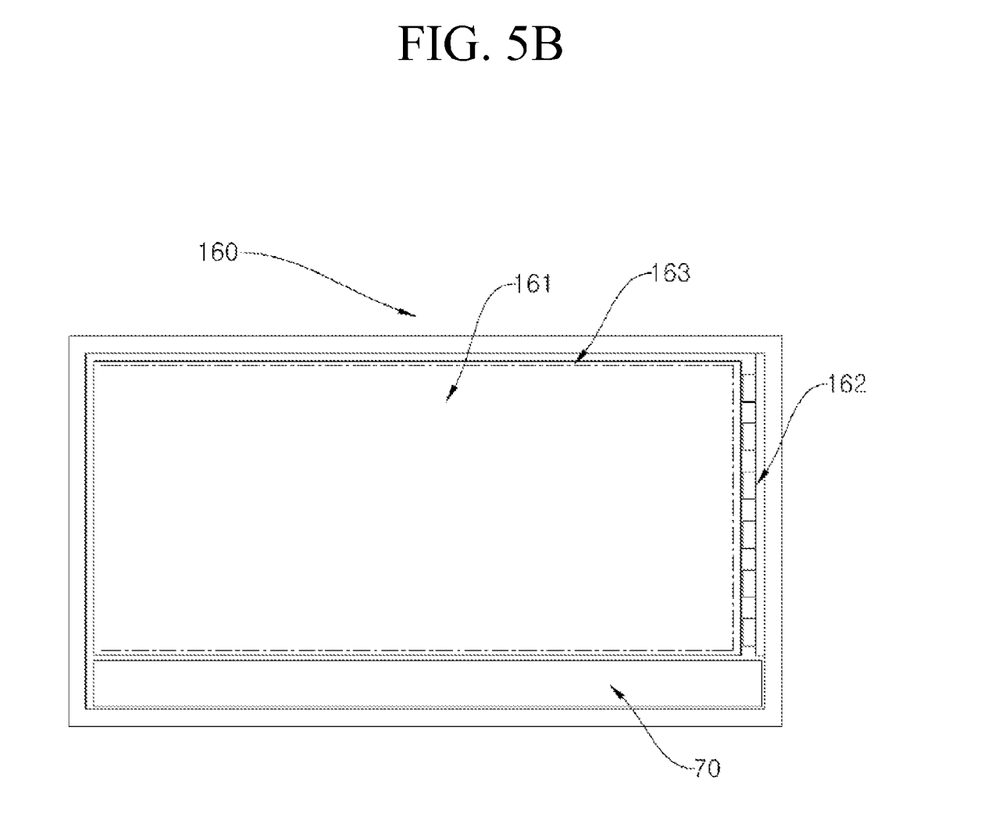
FIG. 5B is a plan view of a backlight unit and an active area of an LCD, according to one embodiment.

FIG. 5A is a plan view of a backlight unit of a conventional liquid crystal display device. FIG. 5B is a plan view of a backlight unit of an LCD device 160, according to one embodiment. Referring to FIG. 5A and Tables 1 and 2, in the conventional liquid crystal display device 150, a light source 152 is disposed on a long axis side of the light guide plate 151 in order to realize high brightness. In addition, the light guide plate 151 is formed to have an area much larger than a liquid crystal panel (not shown) so that the active area 153 of the liquid crystal panel is disposed in a region of the light guide plate 151.

On the other hand, in the embodiment of FIG. 5B, the size of the light guide plate 161 is reduced. Further, the light guide plate 161 and the liquid crystal panel 20 are arranged such that they are biased to one side, and the active area 163 overlaps with a relatively small light guide plate 161. The conventional liquid crystal display device 150 of FIG. 5A and the liquid crystal display device 160 of FIG. 5B are set to have the same size for comparison.

The conventional liquid crystal display device 160 should use a light source having a high light output, or increase the number of light sources in order to improve brightness, while the present invention can exhibit improved brightness using a smaller number of light sources.

The liquid crystal display device 160 of the present invention reduces a size of the light guide plate 60, as compared to the conventional liquid crystal display device 150, thus The liquid crystal display device according to embodiments can exhibit brightness equivalent to or higher than conventional liquid crystal display devices and provide low-power driving and high-quality images despite the use of a fewer number of light source elements. The reduced number of light source elements reduces power consumption and an increase manufacturability of the liquid crystal display device.

As apparent from the fore-going, the present invention provides a backlight unit and a liquid crystal display device comprising the same which reduce a light guide plate size, enable driving at a low power and manufacture at a low cost despite the use of fewer light sources yet realizing high-brightness and high quality-driving.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A backlight unit in a display device, comprising:
a rectangular lower case having a bottom surface and four side walls each extending upward from each of the four edges of the surface;
a supporter separate from the rectangular lower case, the supporter placed on the bottom surface and below a pad portion of a liquid crystal panel, the supporter offset to abut a first side wall of the rectangular lower case but not abut a second side wall opposite to the first side wall, the supporter in conjunction with the second side wall, the third side wall and the fourth side wall of the lower case defining an accommodation area, the supporter formed with an indented surface;

a light guide plate disposed in the accommodation area, the light guide plate configured to transmit light received at a side surface to a top surface;

an optical sheet on the light guide plate, the optical sheet having a leg portion extending from a corner of the optical sheet facing the supporter, the leg portion received in the indented surface of the supporter to fix the optical sheet on the light guide plate; and a light source irradiating the light to the side surface of the light guide plate.

2. The backlight unit according to claim 1, wherein a surface of the supporter facing another side surface of the light guide plate is formed with a pattern to reduce non-uniform illumination at the top surface of the light guide plate.

3. The backlight unit according to claim 1, further comprising a reflection sheet between the light guide plate and the bottom surface of the rectangular lower case to reflect light emitted from a bottom surface of the light guide plate.

4. The backlight unit according to claim 3, further comprising a reflection member between one or more side surfaces of the light guide plate and corresponding one or more side walls of the rectangular lower case, and wherein the reflection sheet comprises a bent portion covering the side surface and a part of the top surface of the light guide plate.

5. The backlight unit according to claim 4, wherein the light source includes at least one light source element at the bent portion to provide the light to the light guide plate.

6. The backlight unit according to claim 5, wherein the bent portion is formed with at least one hole, and the at least one light source element is disposed to correspond to the at least one hole.

7. The backlight unit according to claim 4, further comprising an adhesion member to bond the reflection member to the one or more side walls.

8. The backlight unit according to claim 1, wherein a height of a top surface of the supporter is greater than a sum of a thickness of the light guide plate and a thickness of the optical sheet.

9. The backlight unit according to claim 1, wherein the supporter is a reflector.

10. The backlight unit according to claim 1, wherein the supporter is spaced away from the light guide plate.

11. The backlight unit according to claim 1, wherein a width of the light guide plate is less than 110% of a width of an active area of the liquid crystal panel, and a length of the light guide plate is less than 110% of a length of the active area of the liquid crystal panel.

12. A liquid crystal display device comprising:
a backlight unit comprising:
a rectangular lower case having a bottom surface and four side walls each extending upward from each of the four edges of the surface;

a supporter separate from the rectangular lower case and placed on the bottom surface, the supporter offset to abut a first side wall of the rectangular lower case but not abut a second side wall opposite to the first side wall, the supporter in conjunction with the second side wall, the third side wall and the fourth side wall of the lower case defining an accommodation area, the supporter formed with an indented surface;

a light guide plate disposed in the accommodation area, the light guide plate configured to transmit light received at a side surface to a top surface;

an optical sheet on the light guide plate, the optical sheet having a leg portion extending from a corner of the optical sheet facing the supporter, the leg portion received in the indented surface of the supporter to fix the optical sheet on the light guide plate; and a light source irradiating the light to the side surface of the light guide plate;

a liquid crystal panel disposed in an upper part of the backlight unit, the liquid crystal panel comprising a pad portion above the supporter; and a guide panel disposed between the liquid crystal panel and the backlight unit.

13. The liquid crystal display device according to claim 12, wherein a surface of the supporter facing another side surface of the light guide plate is formed with a pattern to reduce non-uniform illumination at the top surface of the light guide plate.

14. The liquid crystal display device according to claim 12, further comprising a reflection sheet between the light guide plate and the bottom surface of the rectangular lower case to reflect light emitted from a bottom surface of the light guide plate.

15. The liquid crystal display device according to claim 14, further comprising a reflection member between one or more side surfaces of the light guide plate and corresponding one or more side walls of the rectangular lower case, and wherein the reflection sheet comprises a bent portion covering the side surface and a part of the top surface of the light guide plate.

16. The liquid crystal display device according to claim 15, wherein the light source includes at least one light source element at the bent portion to provide the light to the light guide plate, and wherein the bent portion is formed with at least one hole, and the at least one light source element is disposed to correspond to the at least one hole.

17. The liquid crystal display device according to claim 12, wherein a height of a top surface of the supporter is greater than a sum of a thickness of the light guide plate and a thickness of the optical sheet.

18. The liquid crystal display device according to claim 12, wherein a width of the light guide plate is less than 110% of a width of an active area of the liquid crystal panel, and a length of the light guide plate is less than 110% of a length of the active area of the liquid crystal panel.

* * * * *